UNITED STATES PATENT OFFICE 2,215,812

CELLULAR CONCRETE

Philip Kaplan, Teaneck, N. J., assignor to The Richards Chemical Works, Incorporated, Jersey City, N. J., a corporation of New Jersey No Drawing. Application July 9, 1938,
Serial No. 218,391

4 Claims. (Cl. 106—27)

This invention relates generally to improvements in cellular concrete castings and more particularly to a product by which to produce such improvements.

Since the development of concrete there have been many proposals to alter its properties, both physical and chemical, to suit particular requirements. For instance, it has been proposed to accelerate the setting of concrete, to harden it, and recently to decrease its specific gravity or its weight per cubic foot. In producing this light weight or cellular concrete, it has been variously proposed to use rosin soaps, gas evolving chemicals, rosin and formaldehyde dissolved in a suitable organic solvent, and one or several acids obtained from the hydrolysis of proteins with or without other auxiliary substances.

In order to cast cellular concrete properly, the slurry must have certain properties. The slurry must have substantial uniformity throughout the mixing and initial set. It must harden within a definite period so that the aggregate shall not settle out. The finished casting when hardened should have a definite minimum shrinkage, the surface should be smooth without any holes or pockets, the edges must be uniform and sharp. After many experiments it has been proven that the ingredients formerly used and partially enumerated above, when used in conjunction with the usual auxiliaries such as calcium chloride, do not impart these desirable or essential characteristics to the slurry.

I have discovered that by using a product containing the proper proportions of a salt of an alkylated naphthalene sulphonate, more particularly the sodium salt of di-iso-propyl naphthalene sulphonate having generally the graphic formula

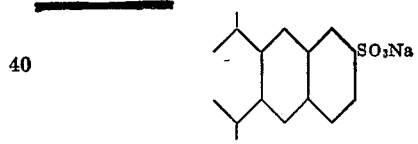

together with suitable protein-like matter such as degenerated glue, gelatine, deacetylated chitin, zein, soya bean protein, casein in a concrete slurry, the resulting concrete casting will be uniform throughout, will have no pockets on the surface, its edges will be sharp and smooth, and it may be easily removed from the mold without sticking. In the case of a cast plank it will be soft enough to allow nails to be hammered through. In addition, the weight of the concrete casting will be reduced from 122 pounds to the cubic foot to 75 pounds to the cubic foot.

My new product is especially useful in the production of such concrete castings as planks, slabs and blocks, where fireproof construction is desirable and light weight essential. My invention is particularly suitable where cinders or slag are used as the aggregate. For example, I take two to three ounces of my product, dissolve it in about one gallon of lukewarm water and add that to about four gallons of water containing about one to two pounds of calcium chloride already in the concrete mixer. I then add thereto four wheelbarrows of cinders of a size to pass through ½ or ¾ inch screen, and two bags of a Portland cement. During the mixing a sufficient amount of water is added to produce a slurry which will be just fluid enough to pour into forms. When poured, these forms are smoothed over with a trowel and allowed to set for eighteen hours after which the forms are taken apart and a smooth uniform surfaced, sharp edged casting will result, weighing 72 to 75 pounds to the cubic foot.

The following examples will serve to illustrate, without limiting, my invention.

Example 1

The product of my invention which I use in forming the slurry just referred to is a compound consisting of 210 pounds of the sodium salt of di-iso-propyl naphthalene sulphonate, and 100 pounds of degenerated glue, and 820 pounds of water. The sodium salt of di-iso-propyl naphthalene sulphonate is made by the conventional process as described in industrial chemistry text books and other literature. The degenerated glue is made by degenerating 110 pounds of hide glue in 200 pounds of water, and by heating it under a pressure of 25 pounds to the square inch for three to six hours.

Example 2

216 pounds of the potassium salt of di-iso-propyl naphthalene sulphonate and 100 pounds of solubilized casein solution and 820 pounds of water are mixed together until homogeneous. Two to three ounces of this product is used in the same manner as in Example 1. The casein may be solubilized in the usual way by the use of weak alkali in the proportions of 110 pounds of casein, 200 pounds of water, 5 to 10 pounds of an alkalizing agent such as borax, alkaline phosphates, soda ash, etc.

Example 3

210 pounds of the sodium salt of di-iso-propyl naphthalene sulphonate is mixed with a 20% solution of solubilized deacetylated chitin together with 500 pounds of water. This product is used as in Example 1. The deacetylated chitin is made in the usual manner by treating chitin from shrimp shells with 40% alkali solution. After washing free from alkali, the resultant chitin is neutralized with a suitable acid, preferably acetic acid. In the above examples other proteins such as zein or soya bean protein, may be substituted as the proteinaceous element of the formula.

I claim:

1. In a process of making light concrete blocks, planks and similar articles from a mixture containing in addition to Portland cement and cinders, slag or the like, a quantity of calcium chloride, the step of mixing with the above mentioned ingredients a small percentage of a liquid aqueous solution of a compound comprising a salt of di-iso-propyl naphthalene sulphonate and a protein-like substance selected from the class consisting of gelatine, deacetylated chitin, zein, soya bean protein, degenerated glue and casein.

2. A process as claimed in claim 1, in which said compound consists of 210 parts by weight of the sodium salt of di-iso-propyl naphthalene sulphonate, 100 parts by weight of degenerated glue, and 820 parts by weight of water.

3. A process, as claimed in claim 1, in which said compound consists of 216 parts by weight of the potassium salt of di-iso-propyl naphthalene sulphonate, 100 parts by weight of solubilized casein and 820 parts by weight of water.

4. A process, as claimed in claim 1, in which said compound consists of 210 parts by weight of the sodium salt of di-iso-propyl naphthalene sulphonate, 100 parts by weight of solubilized deacetylated chitin and 500 parts by weight of water.

PHILIP KAPLAN.